Nov. 30, 1965  N. SCHAEFFER  3,220,770

AUTOMOBILE HEADREST

Filed May 22, 1964

INVENTOR
Neil Schaeffer
BY
ATTORNEYS 3,220,770
AUTOMOBILE HEADREST
Neil Schaeffer, East Hills, N.Y., assignor to The U.S. Pillow Corporation, New York, N.Y., a corporation of New York
Filed May 22, 1964, Ser. No. 369,476
1 Claim. (Cl. 297—395)

This invention is for an automobile headrest and is particularly directed to an automobile headrest for use in combination with an automobile window.

In its simplest form, an automobile headrest may be a pillow which is merely placed upon the back of the automobile seat or propped onto the corner between the seat and the automobile frame. Such headrests have the disadvantage of being unsecured. They slip out easily from under the head of the user and thus require frequent attention and adjustment.

Other headrests are known which overcome the problem of slippage. However, these devices are conventionally permanent or semi-permanent installations on the backrest of the automobile seat and are bulky and cumbersome. Further, they are not conveniently adjustable and are of complicated construction.

The present invention overcomes the limitations and inconveniences of the prior art headrest. It is of simple and inexpensive construction and is easy to use. When not in use, its compact size and light weight allow it to be conveniently stored.

Broadly, the invention is for an automobile headrest for use with an automobile window. The headrest comprises a pillow portion and a tab portion. The tab portion is secured at its one end to the pillow portion. The free end of the tab portion is adapted to be held between the top edge of the automobile window and the automobile frame when the window is closed.

A clear understanding of the invention will be had by reference to the drawings which illustrate the preferred embodiment of the invention.

Figure 1:
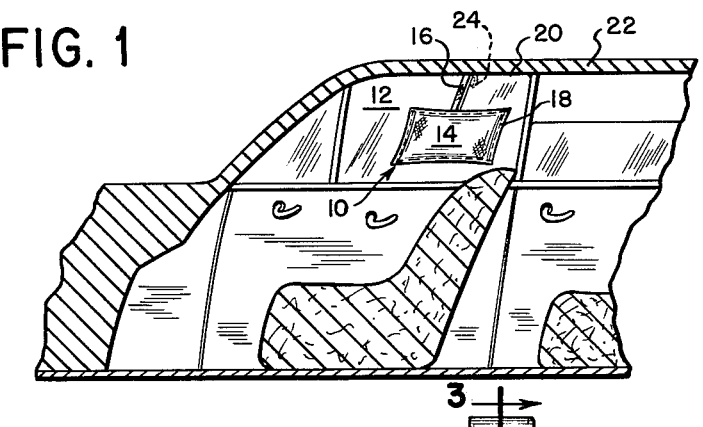
FIG. 1 is a schematic view of the headrest and a portion of a section of an automobile showing the headrest in portion upon the window of the automobile.
Figure 2:
FIG. 2 is a plan view of the headrest.

Referring to FIGS. 1 and 2, the headrest, denoted generally as 10, is shown in position upon an automobile window 12. The headrest 10 comprises a pillow portion 14 and a tab portion 16. The pillow portion 14 may be of various shapes. In the embodiment shown the pillow portion 14 is substantially rectangular in shape and is formed of a suitably resilient material such as foam rubber, polyurethane foam and the like. The pillow portion 14 is covered with a protective material such as a fabric of cotton, polyester fiber and similar cloths. In the construction shown, the fabric covering the pillow portion 14 has a peripheral seam 18.

The tab portion 16 is preferably of the same material as that of the cover for the pillow portion 14. The tab 16 has its one end secured to the pillow portion 14.

The tab 16 may be secured at various locations on the exterior surface of the pillow portion 14 as, for example, upon a face inward of the peripheral seam 18. In the embodiment shown in the drawings the tab 16 is secured to the peripheral seam 18 at a point substantially intermediate of a longitudinal side of the pillow portion 14. By so locating the tab portion 16 the pillow portion 14 is balanced for convenient use.

Figure 3:
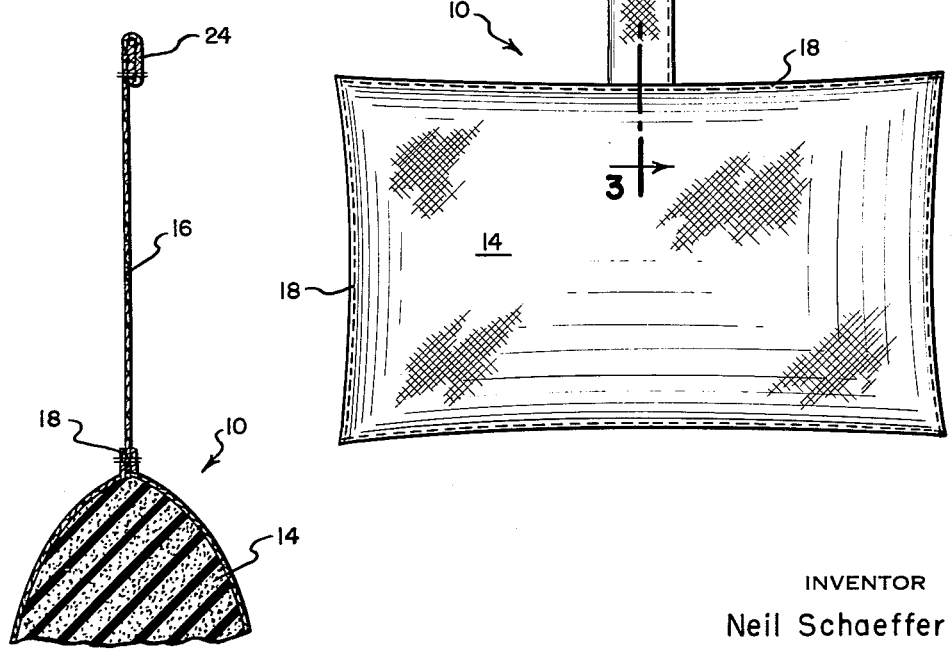
FIG. 3 is a detail section taken through line 3—3 of FIG. 2.

The free end of the tab portion 16 is adapted to be held between the top edge 20 of the automobile window 12 and the window frame 22 when the window is closed. To insure a secure hold and to prevent the tab 16 from slipping between the top edge 20 and the automobile frame 22, the tab is provided with a welt 24 at its free end. The welt 24 may be formed in a variety of ways but is advantageously made by folding over a portion of the tab end upon itself and sewing it to the tab. This construction of the welt 24 is best seen in FIG. 3.

The use of the headrest 10 is convenient and simple. The automobile window 12 is partially opened and the free end of tab 16 is placed over the top edge 20 of the window with the welt 24 extending outside the automobile. The window 12 is then closed thereby clamping the tab portion 16 between the top edge 20 and the window frame 22. So held, the pillow portion 14 rests against the interior side of the window 12 in a balanced manner. Thus, the passenger in the automobile may comfortably rest his head against the pillow portion 14 assured that it will not fall or slip. Initial adjustments in the position of the headrest 10 are easily made by raising or lowering the tab portion 16 on the window 12 before closing.

When not in use, the headrest 10 may be quickly removed by simply lowering the window 12. No storage problem is presented. The tab 16 need only be folded upon the pillow portion 14 and the headrest then stored, for example, upon the rear shelf of the automobile or in the trunk.

I claim.

In combination, an automobile window, an automobile frame, and an automobile headrest, said headrest comprising a substantially rectangular pillow portion having a peripheral seam and a tab portion, said tab portion being secured to a face of said pillow portion inward of said peripheral seam at its one end at a point substantially intermediate of the longitudinal portion of said peripheral seam of said pillow portion, and a welt integral with the free end of said tab portion to prevent said tab portion from slipping between said automobile window and the automobile frame when said window is closed.

References Cited by the Examiner
UNITED STATES PATENTS

| | | | |
|---|---|---|---|
| 2,591,306 | 4/1952 | Sherman | 297—284 |
| 2,708,475 | 5/1955 | Krewson | 297—284 |
| 2,760,788 | 8/1956 | Segall | 297—391 |

FRANK B. SHERRY, *Primary Examiner.*